United States Patent
Tenny et al.

(10) Patent No.: US 10,499,307 B2
(45) Date of Patent: Dec. 3, 2019

(54) SYSTEM AND METHOD FOR DYNAMIC DATA RELAYING

(71) Applicant: Futurewei Technologies, Inc., Plano, TX (US)

(72) Inventors: Nathan Edward Tenny, Poway, CA (US); Haibo Xu, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/691,963

(22) Filed: Aug. 31, 2017

(65) Prior Publication Data
US 2018/0279202 A1    Sep. 27, 2018

Related U.S. Application Data

(60) Provisional application No. 62/477,138, filed on Mar. 27, 2017.

(51) Int. Cl.
| | | |
|---|---|---|
| *H04W 40/24* | (2009.01) | |
| *H04W 40/22* | (2009.01) | |
| *H04W 76/14* | (2018.01) | |
| *H04W 76/32* | (2018.01) | |
| *H04W 80/02* | (2009.01) | |

(Continued)

(52) U.S. Cl.
CPC ......... *H04W 40/22* (2013.01); *H04W 40/246* (2013.01); *H04W 76/14* (2018.02); *H04W 76/32* (2018.02); *H04W 76/30* (2018.02); *H04W 80/02* (2013.01); *H04W 88/04* (2013.01)

(58) Field of Classification Search
CPC ..... H04W 40/22; H04W 76/14; H04W 76/32; H04W 40/246; H04W 88/04; H04W 80/02
See application file for complete search history.

(56) References Cited

U.S. PATENT DOCUMENTS

| | | | | |
|---|---|---|---|---|
| 2005/0048914 A1* | 3/2005 | Sartori | ................. | H04B 7/2606 455/11.1 |
| 2013/0034020 A1* | 2/2013 | Morgan | ................. | H04W 84/14 370/255 |

(Continued)

FOREIGN PATENT DOCUMENTS

| | | |
|---|---|---|
| CN | 105027468 A | 11/2015 |
| CN | 106341860 A | 1/2017 |
| WO | 2017026808 A1 | 2/2017 |

OTHER PUBLICATIONS

"3rd Generation Partnership Project; Technical Specification Group Radio Access Network; Study on further enhancements to LTE Device to Device (D2D), User Equipment (UE) to network relays for Internet of Things IoT) and wearables; (Release 14)," 3GPP TR 36.746 V0.4.0, Technical Report, Feb. 2017, 14 pages.

(Continued)

*Primary Examiner* — Joseph E Dean, Jr.
(74) *Attorney, Agent, or Firm* — Slater Matsil, LLP (57) ABSTRACT

A method for dynamically relaying data includes receiving an advertisement for dynamic relaying services from a relay device, establishing a first device-to-device (D2D) connection with the relay device in accordance with the advertisement, transmitting a data packet to the relay device using the first D2D connection, and releasing the first D2D connection automatically after transmitting the data packet.

25 Claims, 8 Drawing Sheets

(51) Int. Cl.
*H04W 88/04* (2009.01)
*H04W 76/30* (2018.01)

(56) References Cited

U.S. PATENT DOCUMENTS

| | | | | |
|---|---|---|---|---|
| 2014/0185587 A1* | 7/2014 | Jang | ................. | H04W 36/0005 370/331 |
| 2016/0338095 A1* | 11/2016 | Faurie | ............... | H04W 28/0278 |
| 2018/0020442 A1* | 1/2018 | Nair | ...................... | H04W 12/04 |
| 2018/0061219 A1* | 3/2018 | Gordon | ............ | G08B 13/19656 |

OTHER PUBLICATIONS

Bletsas, et al, "A Simple Cooperative Diversity Method Based on Network Path Selection," IEEE Journal on Selected Areas in Communications, vol. 24, No. 3, Mar. 2006, pp. 659-672.

Zhou, et al., "Decode-and-Forward Two-Way Relaying with Network Coding and Opportunistic Relay Selection," IEEE Transactions of Communications, vol. 58, No. 11, Nov. 2010, pp. 3070-3076.

"3rd Generation Partnership Project; Technical Specification Group Radio Access Network; Study on Licensed-Assisted Access to Unlicensed Spectrum; (Release 13)," 3GPP TR 36.889, V13.0.0, Jun. 2015, 285 pages.

"3rd Generation Partnership Project; Technical Specification Group Services and System Aspects; Proximity-based services (ProSe); Stage 2, (Release 15)," 3GPP TS 23.303, V15.1.0, Jun. 2018, 130 pages.

"Bluetooth Core Specification," Bluetooth SIG Proprietary, V5.0, Dec. 6, 2016, 2822 pages.

"Technical Specification Group Radio Access Network; Evolved Universal Terrestrial Radio Access (E-UTRA); User Equipment (UE) procedures in idle mode", MulteFire Alliance, MF TS 36.304 V1.0.1, (May 2017), 59 pages.

"Guidelines for MulteFire Specifications (Release 1)", MulteFire Alliance, MFA TR MF .100 V1.0.1, (Apr. 2017), 7 pages.

"MulteFire Deployment Scenarios and Requirements (Release 1)", MulteFire Alliance, MFA TR MF .101 V1.0.2, (Feb. 2017), 14 pages.

"Non-Access-Stratum (NAS) protocol for Evolved Packet System (EPS); Stage 3 (Release 1.0)", MulteFire Alliance, MFA TS 24.301 V1.0.2, (Feb. 2017), 472 pages.

"Security Architecture (Release 1.0)", MulteFire Alliance, MFA TS 33.401 V1.0.2, (Feb. 2017), 153 pages.

"Technical Specification Group Radio Access Network; Evolved Universal Terrestrial Radio Access (E-UTRA); User Equipment (UE) radio transmission and reception (Release 1.0)", MulteFire Alliance, MFA TS 36.101 V1.0.0, (Dec. 2017), 1396 pages.

"Technical Specification Group Radio Access Network; Evolved Universal Terrestrial Radio Access (E-UTRA); Base Station (BS) radio transmission and reception (Release 1.0)", MulteFire Alliance, MFA TS 36.104 V1.0.0, (Dec. 2017), 217 pages.

"Evolved Universal Terrestrial Radio Access (E-UTRA): Requirements for support of radio resource management (Release 1.0)", MulteFire Alliance, MFA TS 36.133 V1.0.0, (Dec. 2017), 2493 pages.

"Evolved Universal Terrestrial Radio Access (E-UTRA); MF physical layer; General description (Release 1.0)", MFA TS 36.201 V1.0.2, (Dec. 2017), 18 pages.

"Evolved Universal Terrestrial Radio Access (E-UTRA): Physical Channels and Modulation (Release 1.0)", MulteFire Alliance, MFA TS 36.211 V1.0.3, (Sep. 2017), 213 pages.

"Evolved Universal Terrestrial Radio Access (E-UTRA); MF physical layer; Multiplexing and channel coding (Release 1.0)", MulteFire Alliance, MFA TS 36.212 V1.0.2, (Oct. 2017), 211 pages.

"Evolved Universal Terrestrial Radio Access (E-UTRA); Physical layer procedures (Release 1.0)", MulteFire Alliance, MFA TS 36.213 V1.0.3, (Dec. 2017), 463 pages.

"Evolved Universal Terrestrial Radio Access (E-UTRA); Services provided by the physical layer (Release 1.0)", MulteFire Alliance, MFA TS 36.302 V1.0.2, (Dec. 2017), 35 pages.

"Evolved Universal Terrestrial Radio Access (E-UTRA); User Equipment (UE) Radio Access Capabilities (Release 1.0)", MulteFire Alliance, MFA TS 36.306 V1.0.2, (Aug. 2017), 65 pages.

"Evolved Universal Terrestrial Radio Access (E-UTRA); Medium Access Control (MAC) protocol specification (Release 1.0)", MulteFire Alliance, MFA TS 36.321 V1.0.2, (Aug. 2017), 106 pages.

"Technical Specification Group Radio Access Network; Evolved Universal Terrestrial Radio Access (E-UTRA); Radio Resource Control (RRC); Protocol specification (Release 1.0)", MulteFire Alliance, MFA TS 36.331 V1.0.3, (Dec. 2017), 674 pages.

"S1 Application Protocol (S1AP)", MulteFire Alliance, MFA TS 36.413 V1.0.3, (Sep. 2017), 306 pages.

"Architecture for PLMN Access Mode Stage 2 (Release 1.0)", MulteFire Alliance, MFA TS MF .201 V1.0.2, (Feb. 2017), 10 pages.

"Architecture for Neutral Host Network Access Mode Stage 2 (Release 1)", MulteFire Alliance, MFA TS MF .202 V1.0.4, (Sep. 2017), 59 pages.

"MulteFire Subscription Management Stage 3 (Release 1)", MulteFire Alliance, MFA TS MF .301 V1.0.2, (Feb. 2017), 18 pages.

"ZigBee Specification," Document 053474r20, Sep. 7, 2012, 622 pages.

* cited by examiner

SYSTEM AND METHOD FOR DYNAMIC DATA RELAYING

This application claims the benefit of U.S. Provisional Application No. 62/477,138, filed on Mar. 27, 2017, entitled "System and Method for Dynamic Data Relaying," which application is hereby incorporated herein by reference.

TECHNICAL FIELD

The present disclosure relates generally to a system and method for digital communications, and, in particular embodiments, to a system and method for dynamic data relaying.

BACKGROUND

A study item has been proposed in the Third Generation Partnership Project (3GPP) to develop a Layer 2 architecture for user equipment (UE)-to-network relaying that operates at the packet data convergence protocol (PDCP) layer, i.e., the data being relayed is forwarded as PDCP protocol data units (PDUs). The study item is referred to as Further enhanced Device-to-Device (FeD2D) communications.

SUMMARY

Example embodiments provide a system and method for dynamic data relaying.

In accordance with an example embodiment, a method for dynamically relaying data is provided. The method includes receiving, by a remote device, an advertisement for dynamic relaying services from a relay device, establishing, by the remote device, a first device-to-device (D2D) connection with the relay device in accordance with the advertisement, transmitting, by the remote device, a data packet to the relay device using the first D2D connection, and releasing, by the remote device, the first D2D connection automatically after transmitting the data packet.

Optionally, in any of the preceding embodiments, wherein receiving the advertisement, establishing the first D2D connection, transmitting the data packet, and releasing the first D2D connection are performed when a quality indicator of a direct link between the remote device and an access node is below a threshold.

Optionally, in any of the preceding embodiments, the method further comprises transmitting, by the remote device, a solicitation for dynamic relaying services.

Optionally, in any of the preceding embodiments, wherein the data packet includes an identifier of the remote device.

Optionally, in any of the preceding embodiments, wherein the identifier is a cell radio network temporary identifier (C-RNTI) of the remote device.

Optionally, in any of the preceding embodiments, wherein establishing the first D2D connection comprises providing an identifier of the remote device to the relay device.

Optionally, in any of the preceding embodiments, wherein the data packet includes an indicator indicating that the remote device has at least one more data packet to transmit.

Optionally, in any of the preceding embodiments, the method further comprises, for each one other data packet of the at least one more data packet, establishing, by the remote device, a second D2D connection, transmitting, by the remote device, the other data packet using the second D2D connection, and releasing, by the remote device, the second D2D connection.

Optionally, in any of the preceding embodiments, wherein the data packet includes a bearer identifier.

Optionally, in any of the preceding embodiments, wherein the data packet is associated with a default bearer.

In accordance with an example embodiment, a method for dynamically relaying data is provided. The method includes advertising, by a relay device, dynamic data relaying services, establishing, by the relay device, a first D2D connection with a remote device, receiving, by the relay device, a received data packet on the first D2D connection, relaying, by the relay device, a relayed data packet comprising at least the received data packet to an access node, wherein the relayed data packet includes an identifier of the remote device, and releasing, by the relay device, the first D2D connection automatically after receiving the received data packet.

Optionally, in any of the preceding embodiments, wherein advertising the dynamic data relaying services, establishing the first D2D connection, receiving the received data packet, relaying the relayed data packet, and releasing the first D2D connection are performed when a quality indicator of a direct link between the relay device and an access node is above a threshold.

Optionally, in any of the preceding embodiments, wherein the received data packet includes the identifier of the remote device.

Optionally, in any of the preceding embodiments, wherein the identifier is a C-RNTI of the remote device.

Optionally, in any of the preceding embodiments, the method further comprises receiving, by the relay device, a solicitation for dynamic relaying services from the remote device.

Optionally, in any of the preceding embodiments, wherein establishing the first D2D connection comprises receiving the identifier from the remote device.

Optionally, in any of the preceding embodiments, wherein the received data packet includes an indicator indicating that the remote device has at least one more data packet to transmit.

Optionally, in any of the preceding embodiments, the method further comprises, for each one other data packet of the at least one more data packet, establishing, by the relay device, a second D2D connection, receiving, by the relay device, the other data packet on the second D2D connection, transmitting, by the relay device, a relayed other packet comprising at least the other received data packet, and releasing, by the relay device, the second D2D connection.

In accordance with an example embodiment, a remote device is provided. The remote device includes one or more processors, and a computer readable storage medium storing programming for execution by the one or more processors. The programming including instructions to configure the remote device to receive an advertisement for dynamic relaying services from a relay device, establish a first D2D connection with the relay device in accordance with the advertisement, transmit a data packet to the relay device using the first D2D connection, and release the first D2D connection automatically after transmitting the data packet.

Optionally, in any of the preceding embodiments, wherein the programming includes instructions to configure the remote device to transmit a solicitation for dynamic relaying services.

Optionally, in any of the preceding embodiments, wherein the programming includes instructions to configure the remote device to provide an identifier of the remote device to the relay device.

Optionally, in any of the preceding embodiments, wherein the data packet includes an indicator indicating that the remote device has at least one more data packet to transmit, and wherein the programming includes instructions to configure the remote device to, for each one other data packet of the at least one more data packet, establish a second D2D connection, transmit the other data packet using the second D2D connection, and release the second D2D connection.

In accordance with an example embodiment, a relay device is provided. The relay device includes one or more processors, and a computer readable storage medium storing programming for execution by the one or more processors. The programming including instructions to configure the relay device to advertise dynamic data relaying services, establish a first D2D connection with a remote device, receive a received data packet on the first D2D connection, relay a relayed data packet comprising at least the received data packet to an access node, wherein the relayed data packet includes an identifier of the remote device, and release the first D2D connection automatically after receiving the received data packet.

Optionally, in any of the preceding embodiments, wherein the programming includes instructions to configure the relay device to receive a solicitation for dynamic relaying services from the remote device.

Optionally, in any of the preceding embodiments, wherein the received data packet includes an indicator indicating that the remote device has at least one more data packet to transmit, and wherein the programming includes instructions to configure the relay device to, for each one other data packet of the at least one more data packet, establish a second D2D connection, receive the other data packet on the second D2D connection, transmit a relayed other data packet comprising at least the other received data packet, and release the second D2D connection.

Practice of the foregoing embodiments enables a remote UE with poor radio condition and/or with power consumption concerns to use a low power link to send data to a relay UE, which uses a high power and/or good radio condition link to relay the data to the network.

Practice of the foregoing embodiments enables a remote UE with small data requirements to use a low overhead procedure (without involvement of servers in the core network, for example) to transmit data. The low overhead procedure reduces communications latency and communications overhead.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
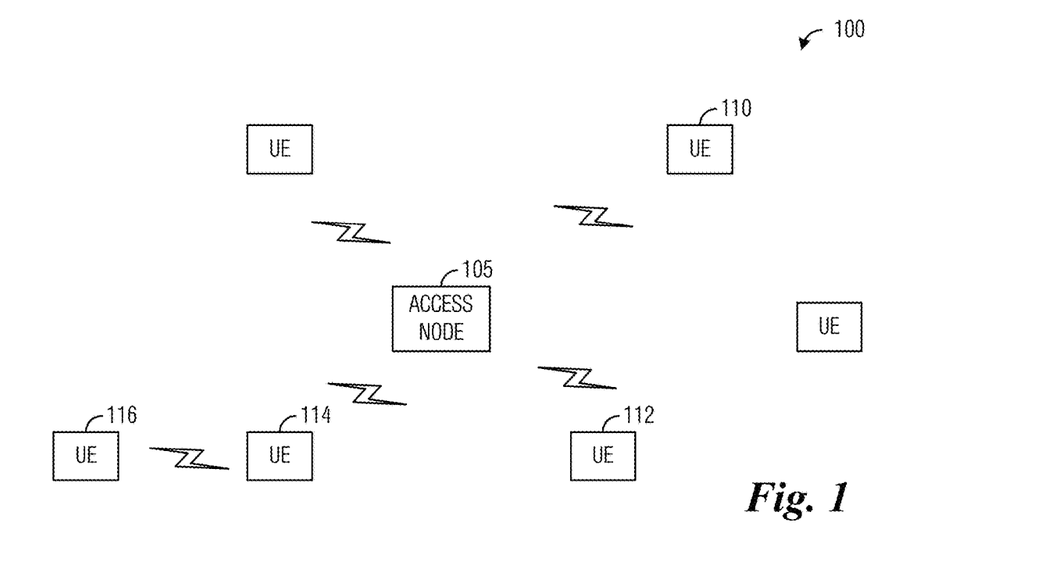
FIG. 1 illustrates an example wireless communications system.

FIG. 1 illustrates an example wireless communications system 100. Communications system 100 includes an access node 105 serving a plurality of UEs, including UEs 110, 112, 114, and 116. In a first communications mode, transmissions originating from or destined for a UE pass through access node 105. In a second communications mode, UEs can communicate directly with one another without having access node 105 serving as an intermediary. Access nodes may also be commonly referred to as NodeBs, evolved NodeBs (eNBs), next generation (NG) Node Bs (gNBs), master eNBs (MeNBs), secondary eNBs (SeNBs), master gNBs (MgNBs), secondary gNBs (SgNBs), base stations, access points, controllers, remote radio heads, and so on. Similarly, UEs may also be commonly referred to as mobiles, mobile stations, stations, terminals, subscribers, users, and so on. While it is understood that communications systems may employ multiple access nodes capable of communicating with a number of UEs, only one access node and six UEs are illustrated for simplicity.

Relayed communications is a form of communications wherein a remote device, such as a remote UE, communicates with a service through a relay device, such as a relay UE. In an uplink relaying deployment, the remote device and the relay device establish relay services and transmissions made by the remote device are first transmitted to the relay device, which then forwards the transmissions to the network (e.g., an access point or a server). In a downlink relaying scenario, transmissions destined for the remote device are routed to the relay device, which then forwards the transmissions to the remote device. Some relaying deployments feature both uplink and downlink relaying.

As an illustrative example, in an uplink relaying deployment, UE 114 is serving as a relay UE for UE 116 and relays uplink transmissions from UE 116 to access node 105. Additionally, if downlink relaying is supported, UE 114 also relays transmissions destined for UE 116. If downlink relaying is not supported, downlink transmissions for UE 114 are transmitted directly to UE 114 by access node 105, using a Uu link (i.e., a link via a Uu interface), for example.

Relaying at the PDCP layer may offer power savings for remote UEs, which transmit on a low power link (e.g., 3GPP Long Term Evolution (LTE) sidelink or a non-3GPP technology, such as IEEE 802.11 Wi-Fi, Bluetooth, Bluetooth Low Energy (BLE), IEEE 802.15.4/ZigBee, 3GPP Long Term Evolution (LTE), LTE-Unlicensed (LTE-U), Licensed Assisted Access (LAA), MuLTEFire, 5G New Radio (NR), etc.) instead of a high power Uu link. The network may also see some benefits as well, for example, UEs with poor radio conditions make use of a more efficient Uu link of another UE with better radio conditions, resulting in more efficient use of the airlink resources by the system as a whole.

Relaying at the PDCP layer may also benefit the communications system by allowing UEs with poor radio conditions to use a link of a UE with better radio conditions. Because the two UEs are close together (a general necessity for low power link communications), the two UEs may be expected to have similar radio conditions, e.g., similar channel conditions. This communications mode may be especially useful for wearable devices and Internet of Things (IoT) devices that may have severe radio frequency (RF) limitations due to size and/or form factor. These types of devices may require better channel conditions than larger and less RF-limited devices, so that a channel in "good" condition for a larger device may be seen as a channel in "poor" condition for an RF-limited device, even if the devices are in close proximity. Moreover, devices in close proximity may experience differences in channel conditions due to obstructions or localized interference.

Currently, 3GPP Proximity Services (ProSe) allows for relaying and requires device pairing to involve a handshake with an application server. The routing of data through the relay device involves a path switch procedure with the network. Therefore, the service framework supported by 3GPP ProSe is burdensome and may not be well suited for dynamic communications involving individual transmissions of small amounts of data.

It is noted that in a communications system, there are UEs with varying link quality, which offers the possibility of implementing dynamic relaying. The relaying may be applied on a message by message basis or even a packet by packet basis. However, the relaying should not depend on high overhead to maintain an ongoing relaying service, as required by the 3GPP ProSe framework, for example.

The packets may be sent using the best available route, meaning that: a device with an uplink with good radio condition should make its uplink available for other devices; a device with an uplink with poor radio condition should seek a device with a better quality uplink to relay communications for it; the relationship between the remote device and the relay device may be dynamically negotiated by the devices themselves and not an application server; and no persistent pairing needs to be maintained between the devices at the service level. The dynamic relaying may be well suited to sparse best-effort data communications, e.g., reports from IoT devices or keep alive transmissions from applications. Applications requiring continuous streams of data would likely benefit from a persistent relaying partnership, allowing for an amortization of the high setup overhead. Applications with strict quality of service (QoS) contracts would be difficult to enforce without a service layer.

According to an example embodiment, a dynamic data relaying service is provided. The dynamic data relaying service involves a remote device and a relay device that are dynamically paired to provide relaying functionality on a per packet (or message) basis, as opposed to the remote device and the relay device establishing a persistent connection and providing relaying functionality for multiple packets or messages. The pairing criteria may be based on link conditions of the involved devices. Parameters controlling the pairing criteria may be under the control of the network. The pairing may be initiated by either the remote device or the relay device.

According to an example embodiment, the dynamic data relaying service is negotiated with a low overhead procedure, e.g., with no involvement of servers in the core network on the critical path. Therefore, peer to peer authentication is not available, meaning that the devices participate as open relays. That is, a device advertising relaying service will accept any packet or message that it receives and will relay it to the network.

According to an example embodiment, the dynamic data relaying service uses a variation of an existing Layer 2 UE-to-network relay architecture. According to an example embodiment, downlink transmissions still use the Uu link, even for a response to the relayed uplink packet or message. In other words, downlink transmissions to the remote device still take place over a direct connection.

Figure 2:
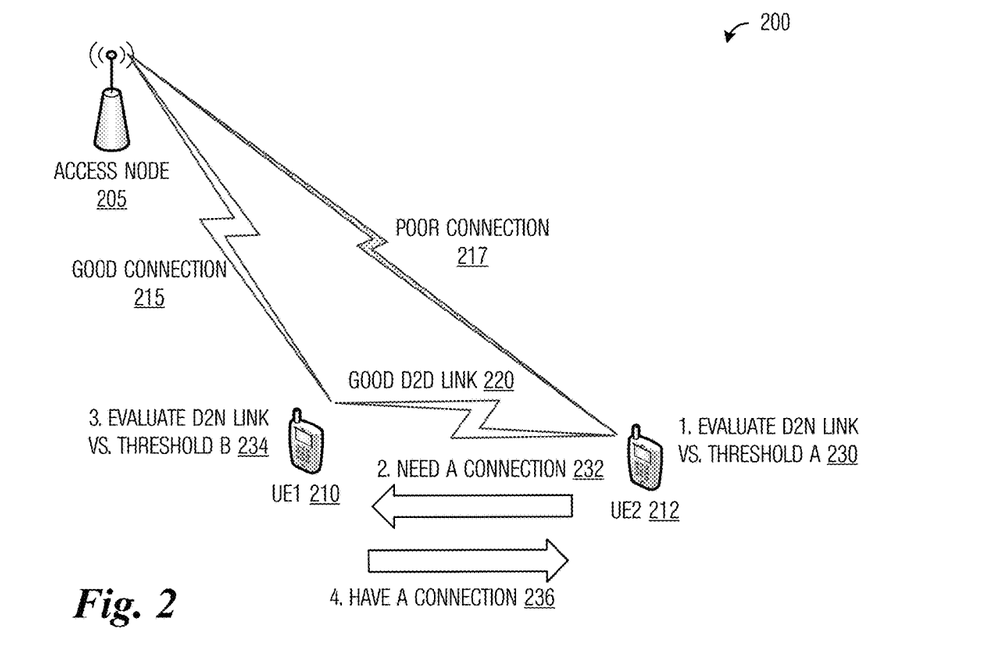
FIG. 2 illustrates a communications system highlighting example interactions between devices participating in dynamic data relaying according to example embodiments described herein.

FIG. 2 illustrates a communications system 200 highlighting example interactions between devices participating in dynamic data relaying. Communications system 200 includes an access node 205, a first UE (UE1) 210, and a second UE (UE2) 212. UE1 210 and UE2 212 are in close proximity to one another. UE1 210 has a good radio connection 215 with access node 205, while UE2 212 has a poor radio connection 217 with access node 205. However, UE1 210 and UE2 212 have a good device-to-device (D2D) link 220 with each other. Dynamic data relaying offers an efficient technique to allow UE2 212 to transmit data to access node 205 by exploiting good D2D link 220 and good radio connection 215 of UE1 210 instead of attempting to transmit the data using poor radio connection 217.

UE2 212 has data to transmit, but after evaluating its device-to-network (D2N) link with respect to a first threshold, such as threshold A, for example (event 230), it determines that it has a poor radio connection (e.g., poor radio connection 217) with access node 205. A variety of quality indicators may be used to evaluate a link.

As an illustrative example, the UE may evaluate the signal strength of a downlink channel from the access node as a proxy for the uplink channel. In communications systems that use time division duplexing (TDD), the evaluation of the uplink channel by evaluating the downlink channel may yield acceptable results. However, in other communications systems, e.g., communications systems using frequency division duplexing (FDD), link imbalance may result in problematic evaluations.

In another illustrative example, grant statistics are used to evaluate the uplink channel. The UE may note that it has never been allocated a high data rate resource grant, and determine that it may have a poor radio condition channel. It may be possible for the network to set the evaluation criterion. For example, the network may specify that the UE should consider the uplink channel to have poor radio conditions if all resource grants use low order modulation (e.g., quadrature phase shift keying (QPSK)) and a specified number of consecutive resource grants do not clear the buffer. It is noted that the clear the buffer criterion provides protection in the situation that the requested data transmissions are very small and the network would give low order modulation grants to ensure link robustness while still allowing the UE to transmit all the requested data. In this situation, the low order modulation used in the uplink channel should not be interpreted as the uplink channel having poor radio conditions.

In yet another illustrative example, the UE is informed by the network that the UE has a poor radio condition uplink channel with the access node. Signaling from the network indicates to the UE that the uplink channel has poor radio condition. The signaling may be in the form of lower layer signaling or higher layer signaling (e.g., radio resource control (RRC) signaling) with additional information. For example, the additional information may inform the UE that the resources are to be used for a discovery procedure. The UE should and/or shall, in this situation, solicit relay services for the uplink. The network may need to know the capability of the UE with respect to the dynamic data relaying service.

UE2 212 transmits a message to UE1 210 (event 232). The message may include an indication indicating that UE2 212 needs a connection to access node 205. Alternatively, the message may include a request for dynamic data relaying services. UE1 210 evaluates its own D2N link to access node 205 with respect to a second threshold, e.g., threshold B (event 234). As shown in FIG. 2, UE1 210 has a good uplink channel (good radio connection 215) to access node 205. UE1 210 transmits a message to UE2 212 (event 236). The message may include an indication indicating that UE1 210 has a good connection to access node 205. Alternatively, the message may include a response to the request for dynamic data relaying services, which, in the example displayed in FIG. 2, includes an affirmative response to the request from UE2 212.

The dynamic data relaying involves the relaying of a data packet (or message) using the Layer 2 relay architecture. After the relaying of the data packet (or the message) is complete, the relationship between the UEs does not persist. In other words, if additional data relaying is needed, additional interaction between the UEs is needed.

It is noted that UE1 210 and UE2 212 should be in relatively close proximity to have a good D2D link. Therefore, the difference in the uplink channels may likely be due to obstructions (or very localized interference) rather than pathloss differences. Alternatively, the difference in the uplink channels may be due to different channel quality requirements for the two devices. As an example, if UE2 212 is limited in its RF capability due to form factor and/or size, UE2 212 may require better channel conditions than UE1 210 in order to have a channel that qualifies as a "good" connection. It is further noted that uplink channel metrics would be better than downlink channel metrics because the dynamic data relaying services are targeting uplink relaying. However, as previously noted, in some situations such as a TDD system where link imbalance is not expected to be significant, downlink channel metrics may be an acceptable proxy for uplink channel metrics.

According to an example embodiment, the dynamic data relaying services may be started by either UE. As an example, UE1 210 of FIG. 2 may announce that it is offering relaying services without necessarily receiving a prior request for relaying services from any UE. As another example, UE2 212 of FIG. 2 may solicit relaying services without necessarily receiving a prior announcement of offered relaying services from any UE.

As related to the delivery of the packet in the network, the access node (e.g., eNB, gNB, etc.) must be able to route the packet to the correct network bearer. This means that the access node has to be able to identify the remote UE. As one possible solution, the remote UE may include its own identifier (UEID, for example), e.g., in the PDCP header; the identifier may be local to the cell (e.g., a cell radio network temporary identifier (C-RNTI)) or global (e.g., a C-RNTI combined with a cell ID). As an alternative solution, the remote UE may expose its identifier (UEID, for example) to the relay UE during the process of solicitation and/or discovery of the relaying service; subsequent to this solicitation and/or discovery process, the D2D link may function as a point-to-point link, allowing the relay UE to assume that any further transmission on this link comes from the same UE whose identifier was exposed in the solicitation and/or discovery process. Additionally, to support data routing in the network, the bearer identifier (e.g., bearer ID) may be included in the PDCP header. The inclusion of the bearer identifier in the PDCP header may not be necessary if the relayed packet is always routed best-effort. In such a situation, the packet may go on the default bearer for the remote UE. It is noted that the identification mechanisms are similar to those considered for Layer 2 UE-to-network relaying. However, service layer involvement (present in Layer 2 UE-to-network relaying) is not involved. For example, there is no involvement of the ProSe function to confirm that the two UEs are allowed to establish a link.

The network should not be involved in the device pairing procedure. The device pairing procedure should occur as rapidly as possible and network involvement would add unwanted latency. Therefore, the remote UE needs to be identified using a long identifier (e.g., the C-RNTI), because the network does not have the opportunity to associate bearers of the remote UE with a local (e.g., local to a particular relay UE) short identifier of the remote UE. Routing in the network depends upon the long identifier (e.g., the C-RNTI) to identify the correct S1 bearer between an access node and the remainder of the network.

Figure 3:
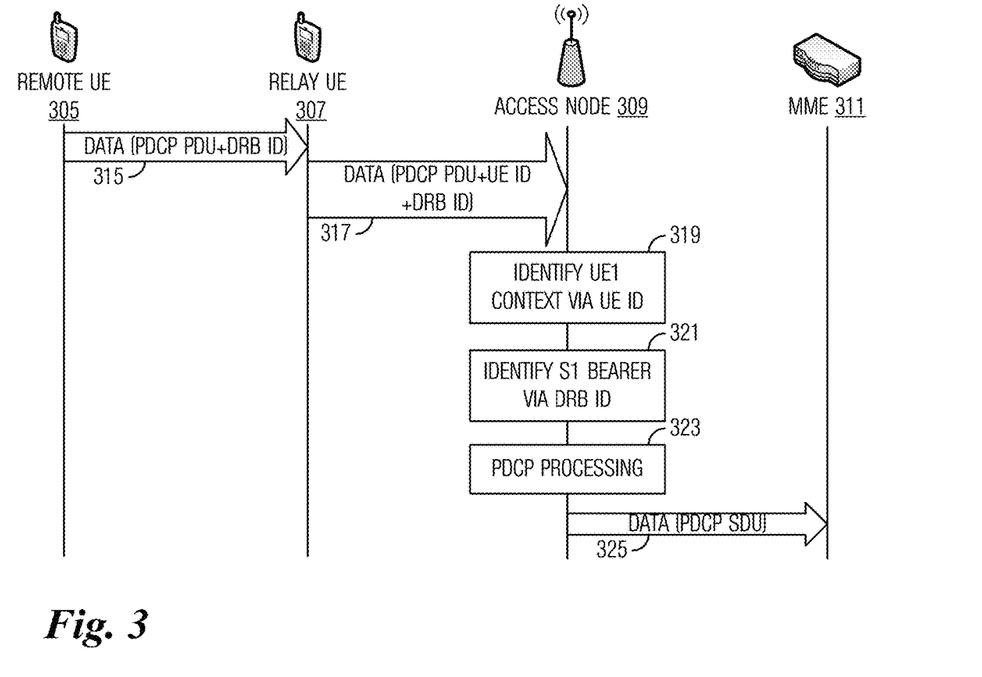
FIG. 3 illustrates a diagram of transmissions made and processing performed by devices participating in dynamic data relaying according to example embodiments described herein.

FIG. 3 illustrates a diagram 300 of transmissions made and processing performed by devices participating in dynamic data relaying. Diagram 300 displays transmissions made and processing performed by devices, such as a remote UE 305, a relay UE 307, an access node 309, and a mobility management entity (MME) 311, as the devices participate in dynamic data relaying.

Remote UE 305 transmits data to be relayed (in the form of a PDCP PDU), along with a data radio bearer (DRB) identifier (DRB ID) to relay UE 307 (event 315). Relay UE 307 relays the data and DRB ID from remote UE 305 to access node 309, along with an identifier of remote UE 305 (e.g., UE ID) (event 317). Access node 309 identifies a context of remote UE 315 using the identifier of remote UE 305 (block 319) and an S1 bearer using the DRB ID (block 321). Access node 309 processes the PDCP PDU (block 323) and relays the data, e.g., a PDCP service data unit (SDU), to MME 311 (event 325).

Figure 4:
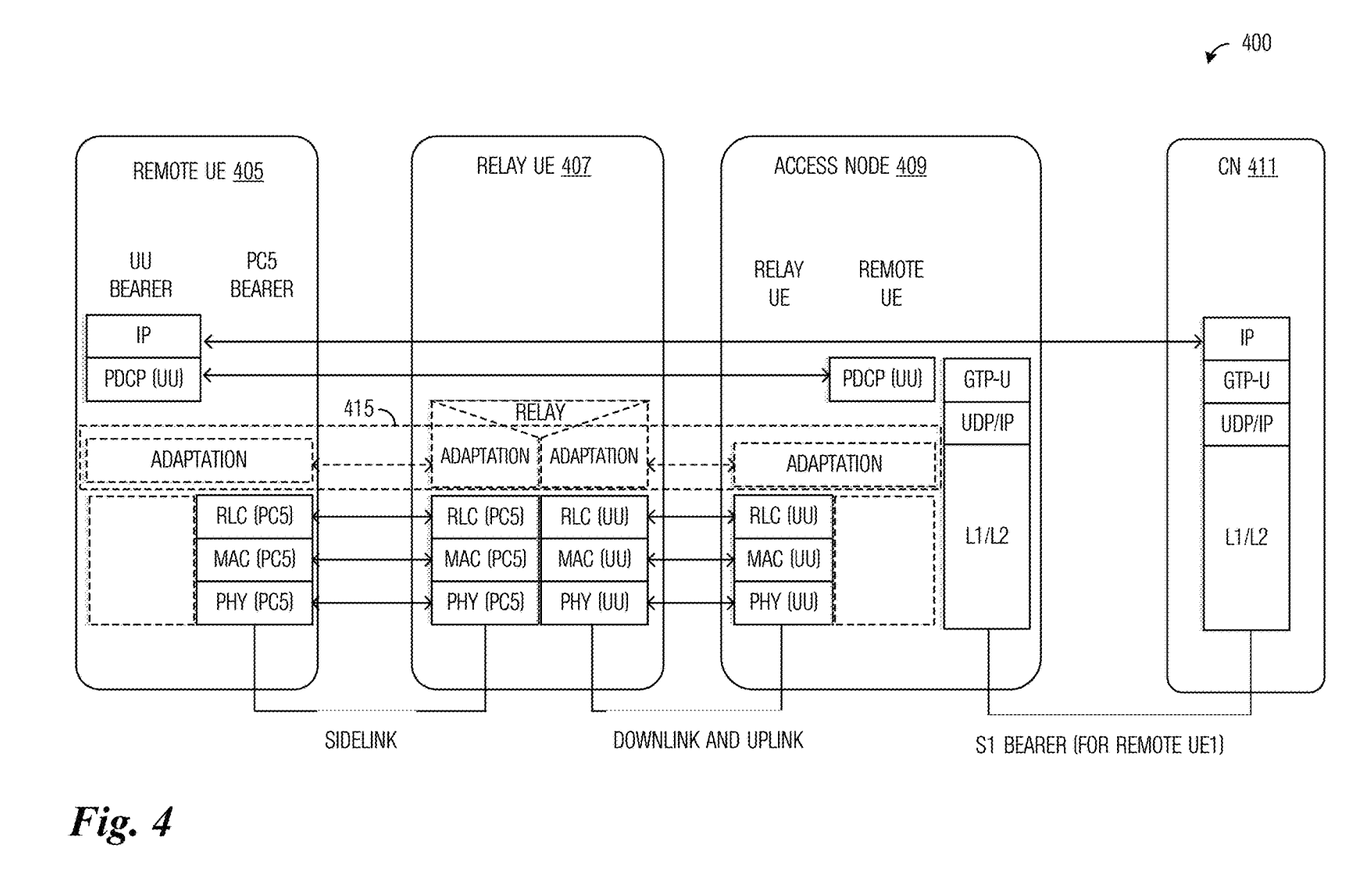
FIG. 4 illustrates a diagram of protocol stacks of devices participating in dynamic data relaying according to example embodiments described herein.

FIG. 4 illustrates a diagram 400 of protocol stacks of devices participating in dynamic data relaying. Diagram 400 displays protocol stacks of a remote UE 405, a relay UE 407, an access node 409, and a core network (CN) 411. An MME is an example of a CN entity. Dynamic data relaying takes place between the radio link control (RLC) and PDCP layers. PC5 (LTE Sidelink) is shown as the short range interface between remote UE 405 and relay UE 407, but any other short range technology may be used, such as Bluetooth, Bluetooth Low Energy (BLE), IEEE 802.11 Wi-Fi, IEEE 802.15.4/ZigBee, 3GPP Long Term Evolution (LTE), LTE-Unlicensed (LTE-U), Licensed Assisted Access (LAA), MuLTEFire, 5G New Radio (NR), etc. Adaptation sublayer 415 handles bearer identification, routing to device identifier, and so on. The presence of adaptation sublayer 415 may be optional on either interface or on both interfaces.

Figure 5:
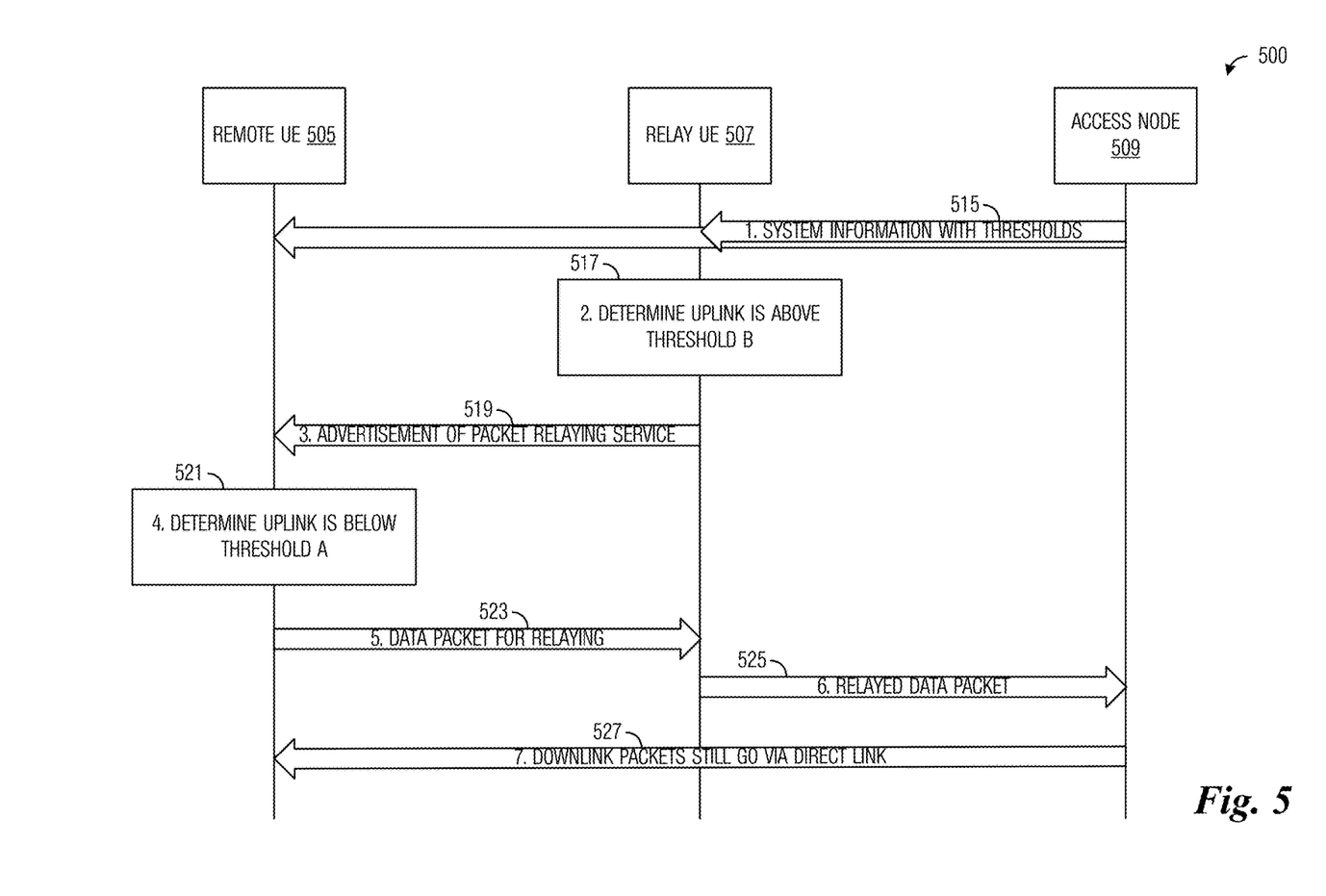
FIG. 5 illustrates a diagram of processing performed and transmissions made by devices participating in dynamic data relaying where a relay UE advertises relaying services according to example embodiments described herein.

FIG. 5 illustrates a diagram 500 of processing performed and transmissions made by devices participating in dynamic data relaying where a relay UE advertises relaying services. Diagram 500 displays processing performed and transmissions made by a remote UE 505, a relay UE 507, and an access node 509.

Access node 509 provides system information, including thresholds used by devices to determine if they may participate in dynamic data relaying (event 515). Relay UE 507 evaluates its uplink channel with access node 509 using a threshold (e.g., threshold B) provided by access node 509 and (for illustrative purposes) determines that the quality indicator of its uplink channel is above the threshold (block 517). Because the quality indicator of an uplink channel of relay UE 507 is above the threshold, relay UE 507 can participate in dynamic data relaying as a relay UE. Relay UE 507 transmits (e.g., broadcasts) an advertisement indicating that it is serving as a relay UE for dynamic data relaying (event 519). By advertising the relaying service, relay UE 507 does not have to wait for a relaying request.

Remote UE 505 evaluates its uplink channel with access node 509 using a threshold (e.g., threshold A) provided by access node 509 and (for illustrative purposes) determines that the quality indicator of its uplink channel is below the threshold (block 521). Because the quality indicator of an uplink channel of remote UE 505 is below the threshold, remote UE 505 can benefit from participating in dynamic data relaying as a remote UE. Remote UE 505 receives the advertisement from relay UE 507 and transmits a data packet (e.g., a PDCP PDU) to relay UE 507 for relaying to access node 509 (event 523). Prior to transmitting the data packet to relay UE 507, remote UE 505 and relay UE 507 pair. The pairing establishes a temporary D2D connection between relay UE 507 and remote UE 505. After transmitting the data packet to relay UE 507, remote UE 505 and relay UE 507 release the temporary D2D connection. Either remote UE 505 or relay UE 507 may initiate the releasing of the temporary D2D connection. The releasing of the temporary D2D connection may occur automatically without either remote UE 505 or relay UE 507 receiving an instruction to do so. Due to the nature of dynamic data relaying, remote UE 505 and relay UE 507 do not have to establish a connection using handshaking or any other connection establishment procedure that persists after the transmission of the data packet. The advertisement in event 519 is a broadcast, while the data packet is transmitted using a unicast transmission, hence the data packet transmission is the only unicast communications between the two UEs. Relay UE 507 automatically accepts and relays the data packet.

There is no authentication between the two UEs. Relay UE 507 does know the identity of remote UE 505, but only a local radio layer identity, e.g., the C-RNTI of remote UE 505. This identity information is passed on to the network, allowing the network to identify the correct PDCP context to receive the data packet. However, relay UE 507 does not have any permanent identifying information about remote UE 505, for example, relay UE 507 has no ability to map remote UE 505 to an international mobile subscriber identity (IMSI) or SAE temporary mobile subscriber identity (S-TMSI).

Although the discussion focuses on the relaying of a single data packet, the example embodiments presented herein are operable with multiple data packets, as long as the number of data packets remains small, such as 1-10 data packets, for example. If remote UE 505 has a large number of data packets to transmit, normal relaying services (such as Layer 2 UE-to-network relaying) should be utilized.

Relay UE 507 relays the data packet to access node 509 (event 525). Access node 509 transmits a response to remote UE 505 (event 527). Although the uplink data packet is relayed through relay UE 507, any downlink response to the uplink data packet is transmitted to remote UE 505 using a direct link, such as a Uu link.

Figure 6:
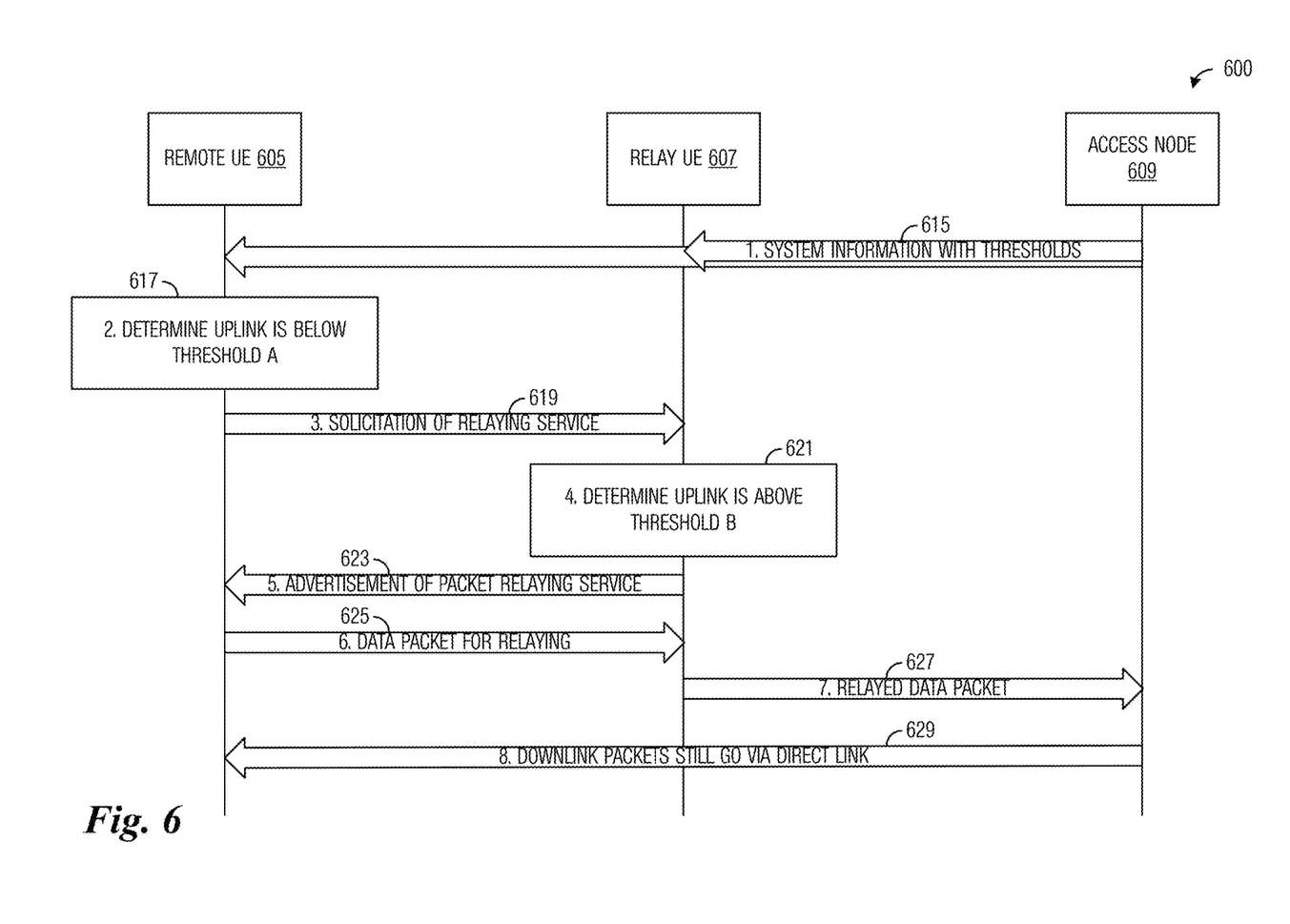
FIG. 6 illustrates a diagram of processing performed and transmissions made by devices participating in dynamic data relaying where a remote UE solicits relaying services according to example embodiments described herein.

FIG. 6 illustrates a diagram 600 of processing performed and transmissions made by devices participating in dynamic data relaying where a remote UE solicits relaying services. Diagram 600 displays processing performed and transmissions made by a remote UE 605, a relay UE 607, and an access node 609.

Access node 609 provides system information, including thresholds used by devices to determine if they may participate in dynamic data relaying (event 615). Remote UE 605 evaluates its uplink channel with access node 609 using a threshold (e.g., threshold A) provided by access node 609 and (for illustrative purposes) determines that the quality indicator of its uplink channel is below the threshold (block 617). Because the quality indicator of the uplink channel of remote UE 605 is below the threshold, remote UE 605 can benefit from participating in dynamic data relaying as a remote UE. Remote UE 605 transmits (e.g., broadcasts) a solicitation requesting dynamic data relaying service (event 619).

Relay UE 607 evaluates its uplink channel with access node 609 using a threshold (e.g., threshold B) provided by access node 609 and (for illustrative purposes) determines that the quality indicator of its uplink channel is above the threshold (block 621). Because the quality indicator of the uplink channel of relay UE 607 is above the threshold, relay UE 607 can participate in dynamic data relaying as a relay UE. Relay UE 607 receives the solicitation requesting dynamic data relaying service from remote UE 605. Relay UE 607 transmits (e.g., unicast) an advertisement for dynamic data relaying to remote UE 605 (event 623). Remote UE 605 transmits a data packet to relay UE 607 for relaying (event 625). Prior to transmitting the data packet to relay UE 607, remote UE 605 and relay UE 607 pair. The pairing establishes a temporary D2D connection between relay UE 607 and remote UE 605. After transmitting the data packet to relay UE 607, remote UE 605 and relay UE 607 release the temporary D2D connection. Relay UE 607 relays the data packet to access node 609 (event 627). Access node 609 transmits a response to remote UE 605 (event 629).

If remote UE 605 has additional data packets to transmit, remote UE 605 may indicate to relay UE 607 regarding the additional data packets. The indication allows relay UE 607 to know if it should continue to listen on the short range communications link. If remote UE 605 has additional data packets to transmit, the temporary D2D link may not be released after the transmission of each data packet. Alternatively, even if remote UE 605 has additional data packets to transmit, the temporary D2D link may be released after the transmission of each data packet, thereby requiring the transmission of each subsequent data packet to include the establishing of a new temporary D2D link. The indication may be in the form of a flag located in the data packet. As an illustrative example, the indication may be in a header of the data packet, e.g., an adaptation layer header.

Unlike the dynamic data relaying using advertisements illustrated in FIG. 5, relay UE 607 may be selective about what it relays and for whom it relays. Relay UE 607 may accept data packets only from UEs that requested the relaying service. No authentication of remote UE 605 is needed. If the short range communications (e.g., Sidelink, Bluetooth, BLE, IEEE 802.11 Wi-Fi, IEEE 802.15.4/Zig-Bee, 3GPP LTE, LTE-U, LAA, MuLTEFire, 5G NR, etc.) is functionally a point to point connection, it may not be possible for other UEs to send anything on the connection if the short range communications has its own link layer security.

As related to integrity and/or authentication of the remote UE, integrity and/or authentication of the remote UE is not needed for delivering the data packet. Encryption is present as part of the Layer 2 relaying architecture. If an attacker impersonates the remote UE, the attacker will only be able to deliver garbage data (which will decrypt to effectively random data) on the bearers of the remote UE. The ability to deliver garbage data is not a security risk that can be mitigated in typical cellular systems because it is also a risk present over direct links. In particular, 3GPP cellular systems such as LTE cannot prevent injection of garbage data on an established connection, because integrity protection is not applied to user data in these systems. If the attacker wishes to deny service to the remote UE, there are attacks that over the air security techniques cannot protect against, such as signal jamming. In general, the network will notice that cyclic redundancy checks (CRCs) will be failing at higher layers (e.g., at the Internet Protocol (IP) layer), which should be able to protect services from the garbage data being injected by the attacker.

It is noted that impersonating a relay UE is substantially harmless. The attacker will be unable to access the data in the data packets of the remote UE due to the data being encrypted. The attacker will only be able to not relay the data packet, which is another denial of service (DoS) attack specific to the individual remote UE. Such an attack is no more effective than a local jamming attack, but is more difficult to carry out.

Figure 7:
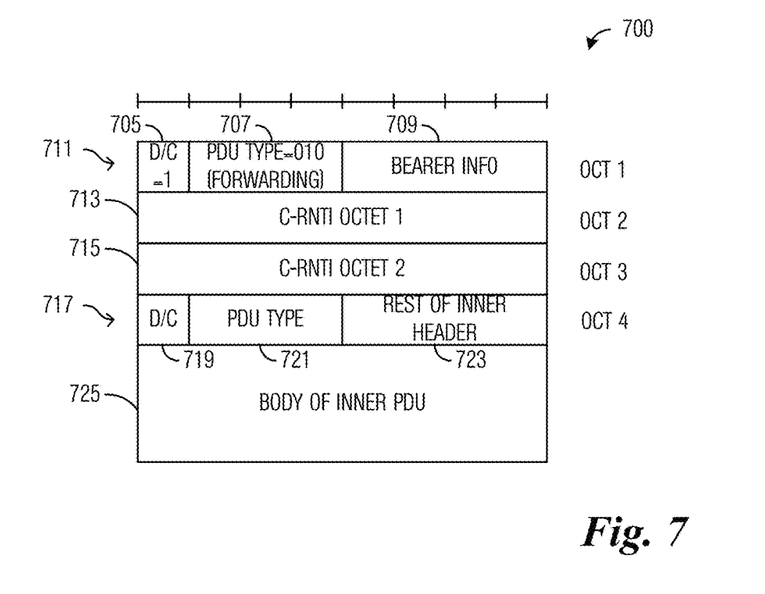
FIG. 7 illustrates an example PDCP PDU according to example embodiments described herein.

FIG. 7 illustrates an example PDCP PDU 700 with an exemplary format suitable for conveying relayed data. PDCP PDU 700 includes a data/control (D/C) field 705 set to value '1' indicating that PDCP PDU 700 is conveying data, a PDU type field 707 set to value '010' indicating that PDCP PDU 700 is for forwarding, and a bearer information field 709 indicating bearer information, all included in an outer header 711. PDCP PDU 700 also includes a first octet 713 and a second octet 715 of the C-RNTI of the remote UE. PDCP PDU 700 also includes an inner header 717 that includes a D/C field 719, a PDU type field 721, and a rest of inner header portion 723. Inner header 717 includes information regarding data contained in body of inner PDU 725.

The dynamic data relaying techniques presented herein may be used for best-effort data delivery. Quality of service (QoS) restrictions cannot be readily guaranteed. The quality of experience (QoE) related to the data packet transmission may be high however, due to the relay link having higher quality condition than the direct link, at additional latency costs.

The dynamic data relaying techniques presented herein are used to relay data packets. Control information of Layers 2 and 3 are still sent using the direct link between the remote UE and the access node. Hybrid automatic repeat request (HARQ) is not used because the Uu physical (PHY) layer is not used. In an additional example embodiment, dynamic data relaying is also used to relay uplink RRC messages, but downlink RRC messages are still sent using the Uu (direct) interface.

Figure 8:
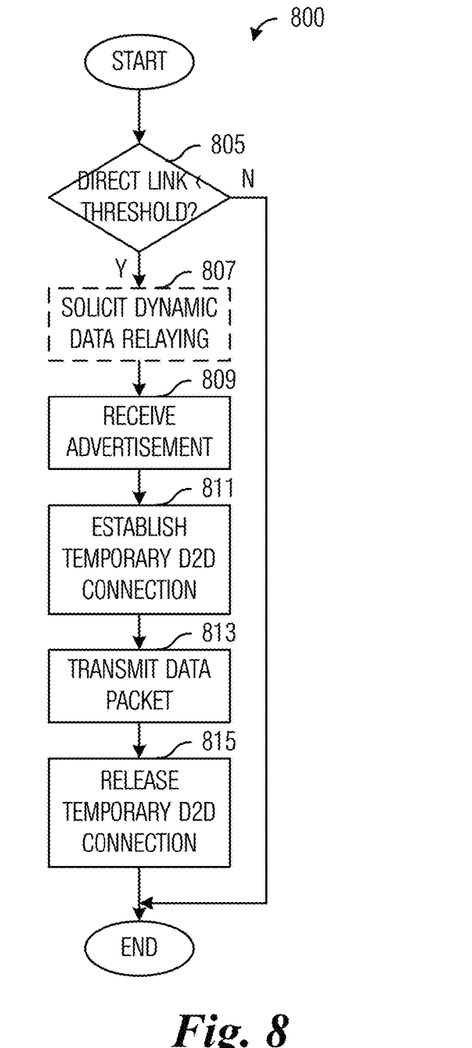
FIG. 8 illustrates a flow diagram of example operations occurring in a remote UE participating in dynamic data relaying according to example embodiments described herein.

FIG. 8 illustrates a flow diagram of example operations 800 occurring in a remote UE participating in dynamic data relaying. Operations 800 may be indicative of operations occurring in a remote UE as the remote UE participates in dynamic data relaying.

Operations 800 begin with the remote UE evaluating the quality indicator of its direct link with an access point against a threshold to determine if it is a candidate for dynamic data relaying (block 805). If the quality indicator of the direct link is below the threshold, the remote UE is a candidate for dynamic data relaying. The remote UE may solicit dynamic data relaying services (block 807). As an illustrative example, the remote UE broadcasts a solicitation for dynamic data relaying services. The remote UE receives an advertisement for dynamic data relaying services (block 809). The advertisement may be a response to the solicitation for dynamic data relaying services from a relay UE. Alternatively, the advertisement is a broadcast advertisement of dynamic data relaying services from a relay UE that is willing to provide relaying services. The remote UE establishes a temporary D2D connection with the relay UE (block 811). The remote UE transmits a data packet to the relay UE using the temporary D2D connection (block 813) and releases the temporary D2D connection (block 815). In an optional example embodiment, in a situation when the remote UE has additional data packets to relay, the remote UE includes in each of the transmitted data packets an indicator indicating that the remote UE has additional data packet(s) to transmit. In such a situation, the temporary D2D connection may not be released after the transmission of each data packet. It is noted that the last data packet will not include the indicator. In an alternative optional example embodiment, each data packet (except for the last data packet) will include the indicator, but the temporary D2D connection is established and released after each data packet is transmitted.

Figure 9:
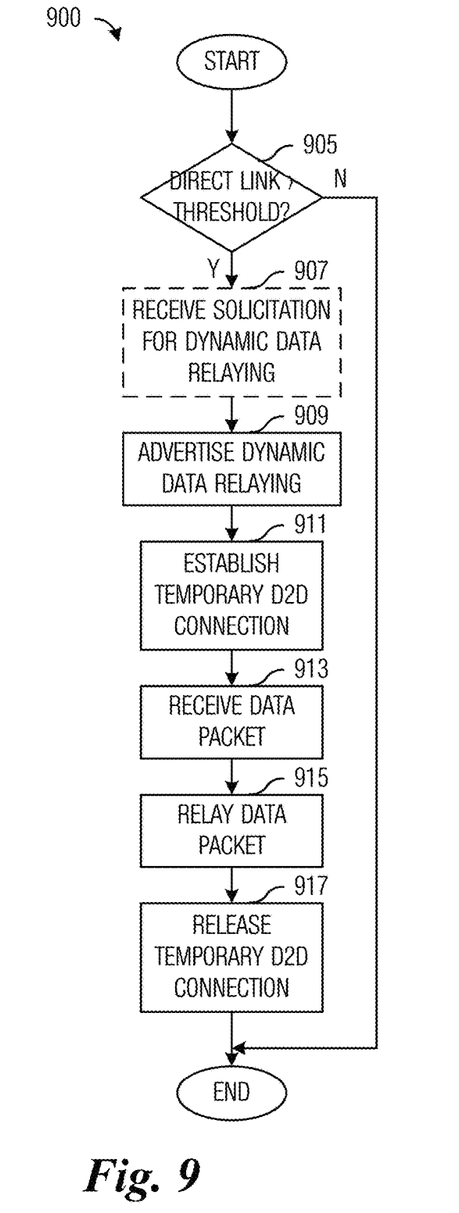
FIG. 9 illustrates a flow diagram of example operations occurring in a relay UE participating in dynamic data relaying according to example embodiments described herein.

FIG. 9 illustrates a flow diagram of example operations 900 occurring in a relay UE participating in dynamic data relaying. Operations 900 may be indicative of operations occurring in a relay UE as the relay UE participates in dynamic data relaying.

Operations 900 begin with the relay UE evaluating the quality indicator of its direct link with an access point against a threshold to determine if it is a candidate for dynamic data relaying (block 905). If the quality indicator of the direct link is above the threshold, the relay UE is a candidate for dynamic data relaying. The relay UE may receive a solicitation for dynamic data relaying from a remote UE (block 907). The relay UE transmits an advertisement for dynamic data relaying service (block 909). In a situation where the relay UE did receive the solicitation, the advertisement may be unicast to the remote UE, while in situation where the relay UE did not receive the solicitation, the advertisement may be broadcast. The relay UE establishes a temporary D2D connection with the remote UE (block 911) and receives a data packet from the remote UE over the temporary D2D connection (block 913). The relay UE relays the data packet to an access node (block 915). The relay UE releases the temporary D2D connection (block 917). In an optional example embodiment, the data packet includes an indicator to indicate that the remote UE has an additional data packet to transmit. In such a situation, the temporary D2D connection may not be released after the reception or relaying of each data packet. It is noted that the last data packet will not include the indicator. In an alternative optional example embodiment, each data packet (except for the last data packet) will include the indicator, but the temporary D2D connection is established and released after each data packet is received or relayed.

Figure 10:
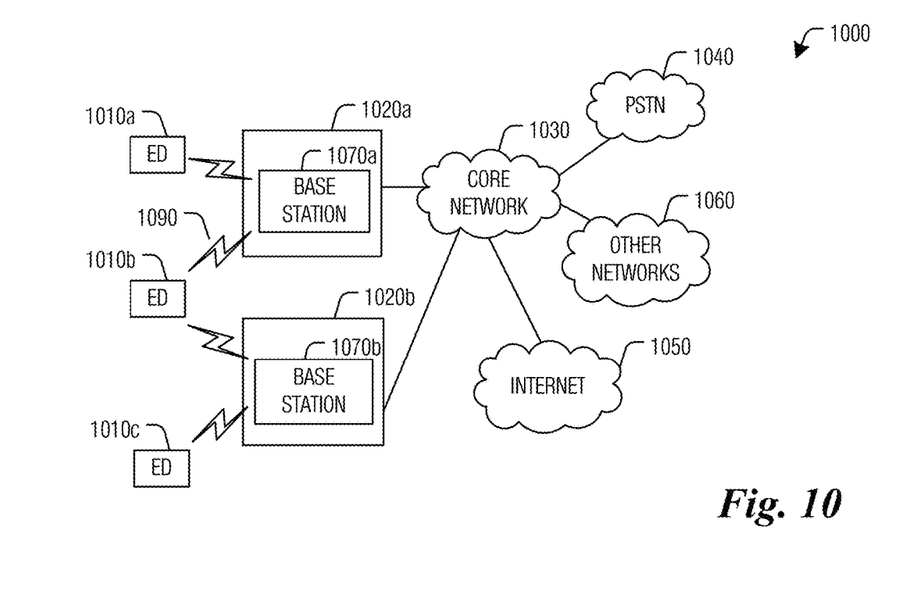
FIG. 10 illustrates an example communication system according to example embodiments described herein.

FIG. 10 illustrates an example communication system 1000. In general, the system 1000 enables multiple wireless or wired users to transmit and receive data and other content. The system 1000 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1000 includes electronic devices (ED) 1010a-1010c, radio access networks (RANs) 1020a-1010b, a core network 1030, a public switched telephone network (PSTN) 1040, the Internet 1050, and other networks 1060. While certain numbers of these components or elements are shown in FIG. 10, any number of these components or elements may be included in the system 1000.

The EDs 1010a-1010c are configured to operate and/or communicate in the system 1000. For example, the EDs 1010a-1010c are configured to transmit and/or receive via wireless or wired communication channels. Each ED 1010a-1010c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1020a-1020b here include base stations 1070a-1070b, respectively. Each base station 1070a-1070b is configured to wirelessly interface with one or more of the EDs 1010a-1010c to enable access to the core network 1030, the PSTN 1040, the Internet 1050, and/or the other networks 1060. For example, the base stations 1070a-1070b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1010a-1010c are configured to interface and communicate with the Internet 1050 and may access the core network 1030, the PSTN 1040, and/or the other networks 1060.

In the embodiment shown in FIG. 10, the base station 1070a forms part of the RAN 1020a, which may include other base stations, elements, and/or devices. Also, the base station 1070b forms part of the RAN 1020b, which may include other base stations, elements, and/or devices. Each base station 1070a-1070b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1070a-1070b communicate with one or more of the EDs Iowa-borne over one or more air interfaces 1090 using wireless communication links. The air interfaces 1090 may utilize any suitable radio access technology.

It is contemplated that the system 1000 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1020a-1020b are in communication with the core network 1030 to provide the EDs 1010a-1010c with voice, data, application, Voice over Internet Protocol (VoIP), or other services. Understandably, the RANs 1020a-1020b and/or the core network 1030 may be in direct or indirect communication with one or more other RANs (not shown). The core network 1030 may also serve as a gateway access for other networks (such as the PSTN 1040, the Internet 1050, and the other networks 1060). In addition, some or all of the EDs 1010a-1010c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1050.

Although FIG. 10 illustrates one example of a communication system, various changes may be made to FIG. 10. For example, the communication system 1000 could include any number of EDs, base stations, networks, or other components in any suitable configuration.

Figure 11A:
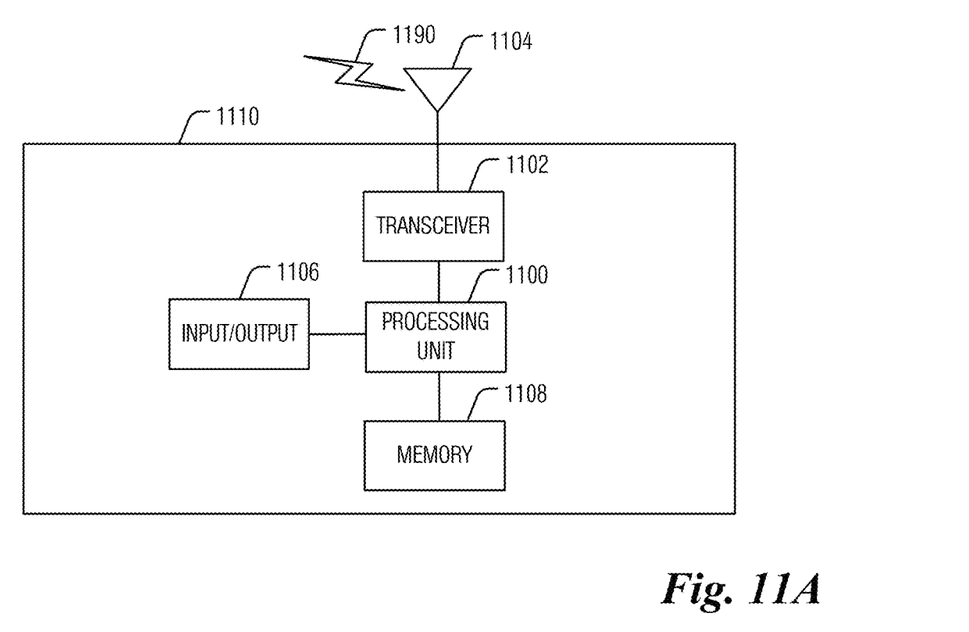
FIGS. 11A and 11B illustrate example devices that may implement the methods and teachings according to this disclosure.
Figure 11B:
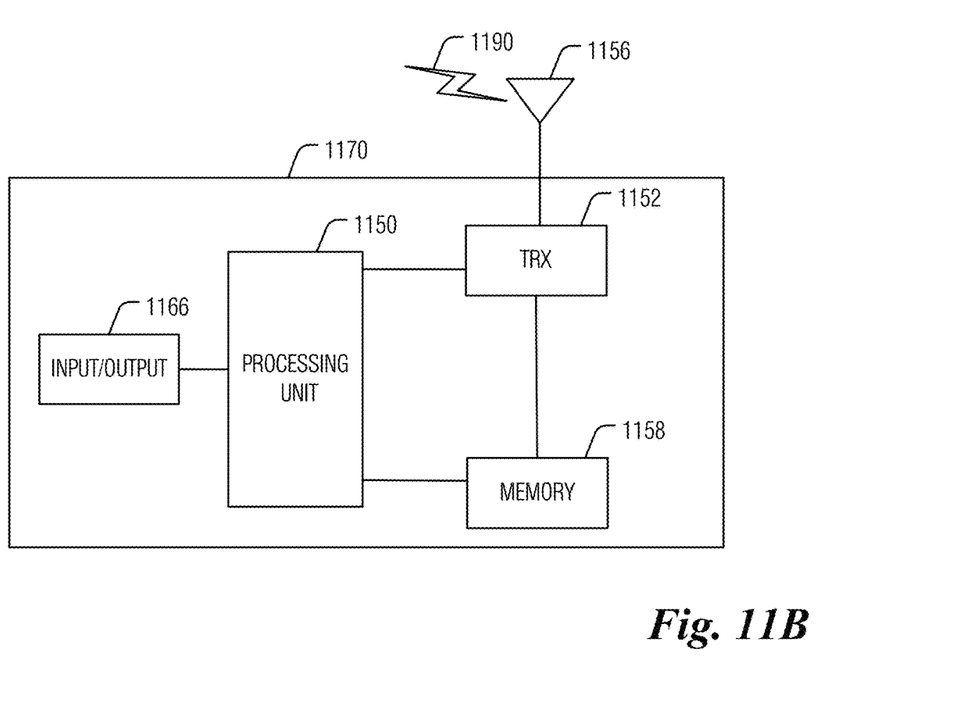

FIGS. 11A and 11B illustrate example devices that may implement the methods and teachings according to this disclosure. In particular, FIG. 11A illustrates an example ED 1110, and FIG. 11B illustrates an example base station 1170. These components could be used in the system 1000 or in any other suitable system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system 1000. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The transceiver 1102 is also configured to demodulate data or other content received by the at least one antenna 1104. Each transceiver 1102 includes any suitable structure for generating signals for wireless or wired transmission and/or processing signals received wirelessly or by wire. Each antenna 1104 includes any suitable structure for transmitting and/or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet 1050). The input/output devices 1106 facilitate interaction with a user or other devices (network communications) in the network. Each input/output device 1106 includes any suitable structure for providing information to or receiving/providing information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1170 includes at least one processing unit 1150, at least one transceiver 1152, which includes functionality for a transmitter and a receiver, one or more antennas 1156, at least one memory 1158, and one or more input/output devices or interfaces 1166. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting and/or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile and/or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Figure 12:
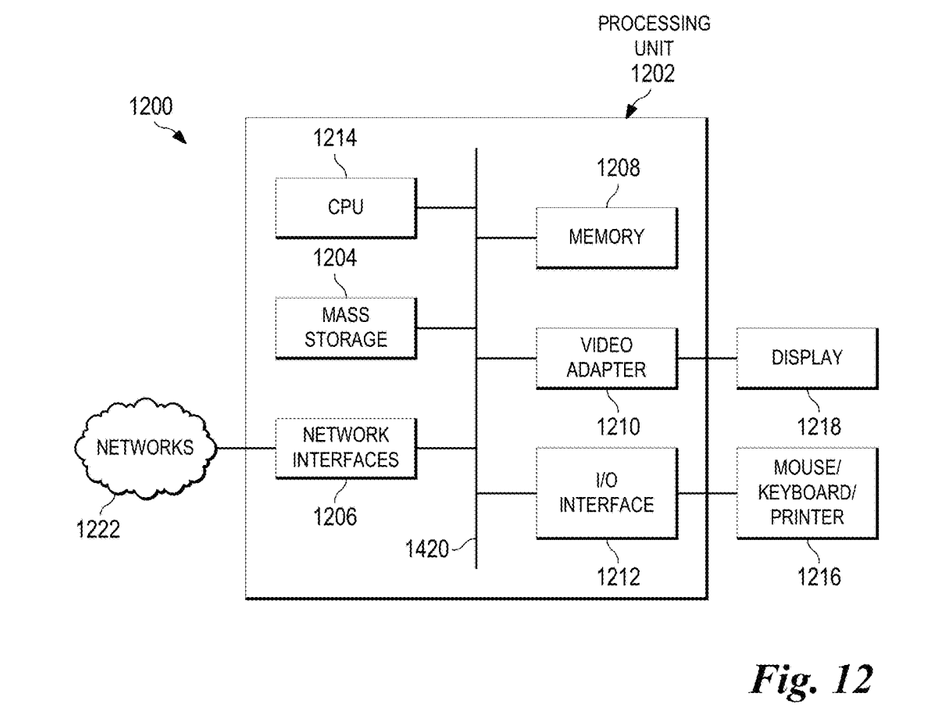
FIG. 12 is a block diagram of a computing system that may be used for implementing the devices and methods disclosed herein.

FIG. 12 is a block diagram of a computing system 1200 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1218 coupled to the video adapter 1210 and a mouse/keyboard/printer 1216 coupled to the I/O interface 1212. Other devices may be coupled to the processing unit 1202, and additional or fewer interface cards may be utilized. For example, a serial interface such as Universal Serial Bus (USB) (not shown) may be used to provide an interface for an external device.

The processing unit 1202 also includes one or more network interfaces 1206, which may comprise wired links, such as an Ethernet cable, and/or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. In an embodiment, the processing unit 1202 is coupled to a local-area network 1222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module, a releasing unit/module, an advertising unit/module, and/or a relaying unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for dynamically relaying data, the method comprising:

receiving, by a remote device, an advertisement for dynamic relaying services from a relay device;

establishing, by the remote device, a first device-to-device (D2D) connection with the relay device in accordance with the advertisement;

transmitting, by the remote device, a data packet to the relay device using the first D2D connection;

releasing, by the remote device, the first D2D connection automatically after transmitting the data packet; and receiving, by the remote device, a response to the data packet directly from an access node.

2. The method of claim 1, wherein receiving the advertisement, establishing the first D2D connection, transmitting the data packet, and releasing the first D2D connection are performed in response to a quality indicator of a direct link between the remote device and the access node being below a threshold.

3. The method of claim 1, further comprising transmitting, by the remote device, a solicitation for dynamic relaying services.

4. The method of claim 1, wherein the data packet includes an identifier of the remote device.

5. The method of claim 4, wherein the identifier is a cell radio network temporary identifier (C-RNTI) of the remote device.

6. The method of claim 1, wherein establishing the first D2D connection comprises providing an identifier of the remote device to the relay device.

7. The method of claim 1, wherein the data packet includes an indicator indicating that the remote device has at least one more data packet to transmit.

8. The method of claim 7, further comprising, for each other data packet of the at least one more data packet:

establishing, by the remote device, a second D2D connection;

transmitting, by the remote device, the other data packet using the second D2D connection; and releasing, by the remote device, the second D2D connection.

9. The method of claim 1, wherein the data packet includes a bearer identifier.

10. The method of claim 1, wherein the data packet is associated with a default bearer.

11. A method for dynamically relaying data, the method comprising:

advertising, by a relay device, dynamic data relaying services;

establishing, by the relay device, a first device-to-device (D2D) connection with a remote device;

receiving, by the relay device, a data packet on the first D2D connection;

relaying, by the relay device, a relayed data packet comprising at least the received data packet to an access node, the relayed data packet including an identifier of the remote device; and releasing, by the relay device, the first D2D connection automatically after receiving the data packet, a response to the relayed data packet from the access node directly to the remote device bypassing the relay device.

12. The method of claim 11, wherein advertising the dynamic data relaying services, establishing the first D2D connection, receiving the data packet, relaying the relayed data packet, and releasing the first D2D connection are performed in response to a quality indicator of a direct link between the relay device and the access node being above a threshold.

13. The method of claim 11, wherein the received data packet includes the identifier of the remote device.

14. The method of claim 11, wherein the identifier is a cell radio network temporary identifier (C-RNTI) of the remote device.

15. The method of claim 11, further comprising receiving, by the relay device, a solicitation for dynamic relaying services from the remote device.

16. The method of claim 11, wherein establishing the first D2D connection comprises receiving the identifier from the remote device.

17. The method of claim 11, wherein the received data packet includes an indicator indicating that the remote device has at least one more data packet to transmit.

18. The method of claim 17, further comprising, for each other data packet of the at least one more data packet:

establishing, by the relay device, a second D2D connection;

receiving, by the relay device, the other data packet on the second D2D connection;

transmitting, by the relay device, a relayed other packet comprising at least the other received data packet; and releasing, by the relay device, the second D2D connection.

19. A remote device comprising:

a non-transitory memory storage comprising instructions; and one or more processors in communication with the non-transitory memory storage, wherein the one or more processors execute the instructions to:

receive an advertisement for dynamic relaying services from a relay device, establish a first device-to-device (D2D) connection with the relay device in accordance with the advertisement, transmit a data packet to the relay device using the first D2D connection, release the first D2D connection automatically after transmitting the data packet, and receive a response to the data packet directly from an access node.

20. The remote device of claim 19, wherein the one or more processors execute the instructions to transmit a solicitation for dynamic relaying services.

21. The remote device of claim 19, wherein the one or more processors execute the instructions to provide an identifier of the remote device to the relay device.

22. The remote device of claim 19, wherein the data packet includes an indicator indicating that the remote device has at least one more data packet to transmit, and wherein the one or more processors execute the instructions to, for each other data packet of the at least one more data packet, establish a second D2D connection, transmit the other data packet using the second D2D connection, and release the second D2D connection.

23. A relay device comprising:

a non-transitory memory storage comprising instructions; and one or more processors in communication with the non-transitory memory storage, wherein the one or more processors execute the instructions to:

advertise dynamic data relaying services, establish a first device-to-device (D2D) connection with a remote device, receive a data packet on the first D2D connection, relay a relayed data packet comprising at least the received data packet to an access node, wherein the relayed data packet includes an identifier of the remote device, and release the first D2D connection automatically after receiving the received data packet, a response to the relayed data packet from the access node directly to the remote device bypassing the relay device.

24. The relay device of claim 23, wherein the one or more processors execute the instructions to receive a solicitation for dynamic relaying services from the remote device.

25. The relay device of claim 23, wherein the received data packet includes an indicator indicating that the remote device has at least one more data packet to transmit, and wherein the one or more processors execute the instructions to, for each other data packet of the at least one more data packet:

establish a second D2D connection, receive the other data packet on the second D2D connection, transmit a relayed other data packet comprising at least the other received other data packet, and release the second D2D connection.

* * * * *